G. M. WEEKS.
MILK CAN.
APPLICATION FILED AUG. 16, 1907.
911,465.
Patented Feb. 2, 1909.
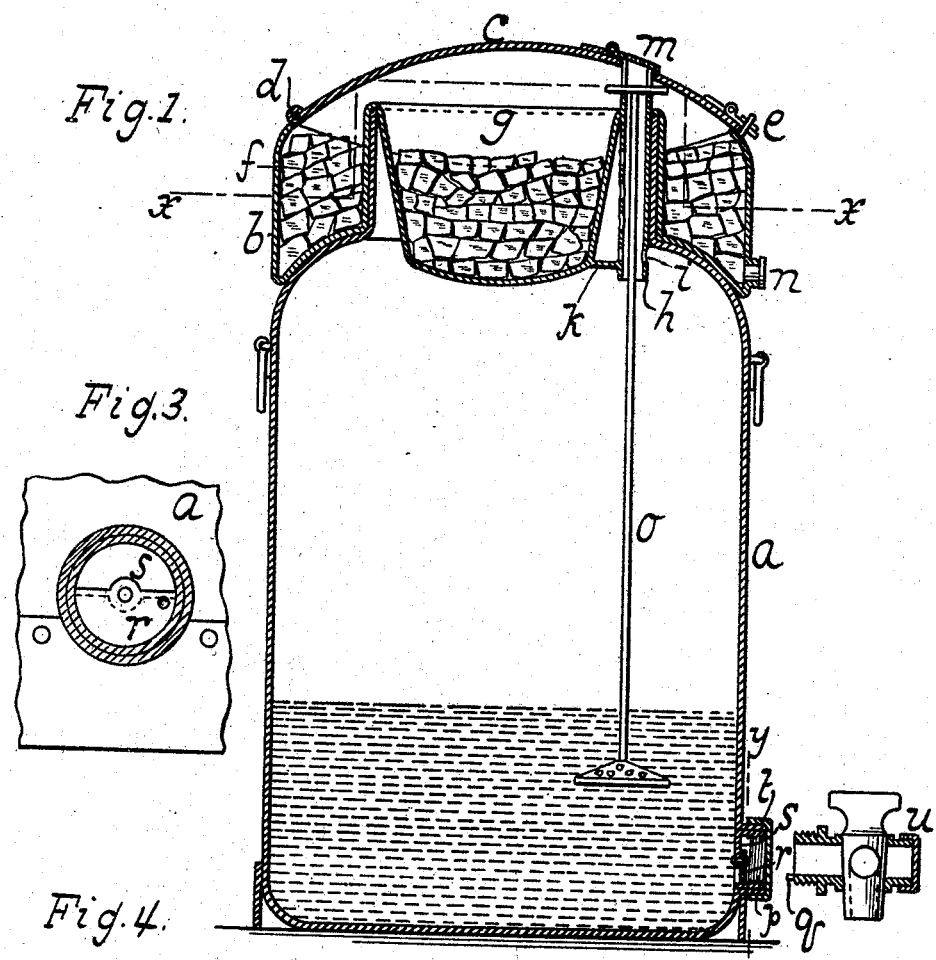
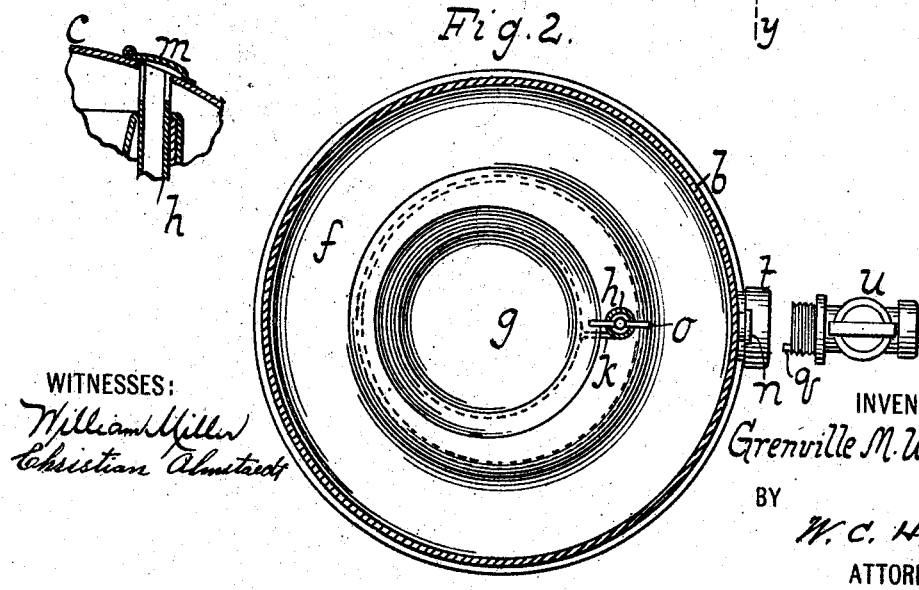
WITNESSES:
William Miller
Christian Almstaedt
INVENTOR
Grenville M. Weeks
BY
W. C. Hauff
ATTORNEY

UNITED STATES PATENT OFFICE.

GRENVILLE M. WEEKS, OF NEWARK, NEW JERSEY.

MILK-CAN.

No. 911,465.   Specification of Letters Patent.   Patented Feb. 2, 1909.

Application filed August 16, 1907. Serial No. 388,903.

*To all whom it may concern:*

Be it known that I, GRENVILLE M. WEEKS, a citizen of the United States, residing at Newark, in the county of Essex and State of New Jersey, have invented new and useful Improvements in Milk-Cans, of which the following is a specification.

This application relates to a ventilated refrigerating germ-checking apparatus, covered by United States Patent No. 536,903, issued to me April 2nd, 1895, for patent milk can cooler.

The improvements consist in a less expensive and more convenient adjustment of a ventilating tube, enough larger to enable it to be adapted to additional useful purposes. That which is new in connection with the ventilating tube specifically is that the ventilation it provides is more perfect by reason of having what is not in the original tube, namely: openings into it from the inside air space around the top part of the neck of the milk can, or similar fluid holding vessel, where the most warmth and confined air is—and where confined fluids require ventilation to guard against germ growth fostered by the stagnation resulting from confined air above a certain temperature in vessels holding milk or other drinkable fluids.

A second improvement is provided by a disk perforated like a pepper bottle cover, which may be pivoted to slide over or hinged to shut down and cover the exposed open top of said tube, and thus guard against dust or dirt falling into it. Interference with proper ventilation is avoided by the cover acting as a perforated screen against dust and outside particles, or by a hasp like projection keeping the disk around its circumference edge a fraction of an inch above the top edges of the tube over which it projects, allowing a seam-like space for exit of animal-heat-air to escape up and out of the can, while the top is roofed in to keep dirt and dust from falling into the milk can.

A third improvement consists in the ventilating tube being projected away from full contact with the ice chamber, through the center of which it passed in the patent above named, by this latter arrangement now offered, the tube is placed in the warmest part of the upper end of the milk-can, and made of a diameter sufficient to admit a milk inspector's thermometer at the place where the milk is warmest, and at such location, if it registers as low a temperature as the State law requires, the rest is sure to be as low, if not lower. This tube device enables the legal milk inspector to test the milk without the exposure to dirt and dust the wind might blow into a milk can, if its cover had to be removed for the inspector to make his examination.

A fourth improvement, is an annular reservoir, extending about the circumference of the cover and resting on the shoulder of the milk can; from the bottom of this annular or ring-like reservoir the water accumulating from the melting ice may be withdrawn through a plug or screw-cap opening in its bottom ring, and by lifting the lid the filling of this annular reservoir with ice may be renewed without lifting off the cover for the emptying of water in renewing space for the ice refilling.

A fifth improvement in connection with this tube is the making of nicks or slots opposite each other in the top edge of the tube, into which the adjustable cross handle of the cream mixing rod may rest, and at the same time hold the disk-dasher at the bottom of the rod in a floating position instead of its resting on the bottom of the milk can and forming a fixed milk line or seam for germ nesting.

A sixth improvement in this refrigerating germ-growth-checking milk can, is in having the bottom of the can stamped into a more concave form within than is usual in the present can form, whose more acute angle seam at the circumference bottom juncture with the can forms a nesting place for the growth of germs more difficult to smoothly polish and cleanse than my devised obtuse angle at this edge, which provides for a more perfect cleansing of cans from any possible left over germs.

This invention affords further economy inasmuch as it saves the cost of manufacture of ice boxes heretofore in use and also the space taken up by said ice boxes. The trouble of cleaning an ice box is also avoided.

This invention is set forth in the following specification and claim and illustrated in the annexed drawing in which:—

Figure 1 is a sectional elevation of a milk can with cover embodying this invention. Fig. 2 is a section along $xx$ Fig. 1. Fig. 3 is a section along $yy$ Fig. 1. Fig. 4 shows a modification of the invention.

The letter $a$ indicates a receptacle or milk can and $b$ is a cover. This cover has a lid $c$ hinged at d and with a fastening or clasp e and said lid can be raised without taking the cover off the can. When the lid is raised ice can be supplied to the annular chamber f and to the inner or central chamber g formed in or as part of the cover.

A ventilating tube h has openings i leading thereinto from the side and this tube is connected or carried by a web k on the inner air chamber. As heat accumulates at the upper part of the can or receptacle it can readily escape through the tube. As such tube is at one side of or outside the ice chamber g the heat passing through the tube does not tend to melt the ice. The two ice chambers with the tube could be formed of one piece of metal or material. An auxiliary lid m gives access to the tube. This auxiliary lid can be opened without opening the main lid. This auxiliary lid can hinge or swivel. It can be perforated for ventilation Fig. 1 or by a boss or lug or bend of the auxiliary lid the latter when closed can leave a lateral space for ventilation Fig. 4.

The tube h when uncovered can serve for the introduction of an instrument for example a thermometer or any testing or inspection desired without opening the entire top of the can or receptacle. Or a mixer or cream dasher can be inserted through the tube so that if milk is drawn off at a stop cock u, the milk by aid of the mixer can first be agitated to avoid quantities that have no uniformity being drawn off.

The top of tube h is notched or shouldered so that the dasher or mixer o can be left suspended in the can clear of the bottom to avoid germs adhering to the can or to the mixer.

The cock or faucet plug u is screw threaded to be attached to the tapped outlet p. This plug has a teat q which as it screws home engages a depression in a rotary mutilated disk r which being turned to overlap the fixed half disk s will open the outlet. An unscrewing of the faucet will reclose the rotary disk section to shut off the outlet. A screw cap t can be applied when the faucet is taken off.

The melted ice can be drawn off from the cover by opening the plug or screw cap n.

What I claim is:—

1. A can or receptacle having a shoulder, a cover having an annular reservoir extending about the circumference of the cover and resting on the shoulder, and a lid for allowing access to the reservoir without displacing the cover.

2. A can or receptacle having a shoulder, a cover having an annular reservoir extending about the circumference of the cover and resting on the shoulder, and a lid for allowing access to the reservoir without displacing the cover said reservoir having an outlet means for the drippings or melted ice.

3. A device of the kind described provided with a cover having an ice chamber and an inspection tube giving access for inspection and tests, said tube having shoulder or rest portions for sustaining a testing or other instrument.

In testimony whereof I have hereunto set my hand in the presence of two subscribing witnesses.

GRENVILLE M. WEEKS.

Witnesses:
EDWARD WIESNER,
CHRISTIAN ALMSTAEDT.